(12) United States Patent
Parenti et al.

(10) Patent No.: US 7,840,414 B1
(45) Date of Patent: Nov. 23, 2010

(54) ADDRESS CORRECTION VERIFICATION AND FEEDBACK

(75) Inventors: Daniel J. Parenti, Chicago, IL (US); Walter S. Conard, Lake Villa, IL (US); Niren Shah, Palatine, IL (US)

(73) Assignee: Bowe Bell + Howell Postal Systems Company

( * ) Notice: Subject to any disclaimer, the term of this patent is extended or adjusted under 35 U.S.C. 154(b) by 935 days.

(21) Appl. No.: 10/867,939

(22) Filed: Jun. 15, 2004

Related U.S. Application Data

(60) Provisional application No. 60/479,045, filed on Jun. 16, 2003.

(51) Int. Cl.
*G06Q 10/00* (2006.01)

(52) U.S. Cl. ..................................... 705/1.1

(58) Field of Classification Search ............... 705/1, 705/1.1
See application file for complete search history.

(56) References Cited

U.S. PATENT DOCUMENTS

| | | | | |
|---|---|---|---|---|
| 5,770,841 | A * | 6/1998 | Moed et al. | 235/375 |
| 6,647,385 | B2 * | 11/2003 | Seestrom et al. | 707/7 |
| 7,137,558 | B2 * | 11/2006 | Aigeldinger | 235/462.16 |
| 2001/0032881 | A1 * | 10/2001 | Wells et al. | 235/385 |
| 2002/0168090 | A1 * | 11/2002 | Bruce et al. | 382/101 |
| 2003/0171946 | A1 * | 9/2003 | Kelly | 705/1 |
| 2003/0188660 | A1 * | 10/2003 | Foth et al. | 101/484 |
| 2004/0148355 | A1 * | 7/2004 | Krause et al. | 709/206 |

OTHER PUBLICATIONS

Unknown Author, "'Move-Update' Rules Delayed, but Don't Wait to Improve Address Quality", Mail Center Management Report, Jan. 1997, pp. 1-4.*
Unknown Author, "Zen and the Art of Good Mail List Maintenance," Mail Center Management Report, Feb. 2000, pp. 1-3.*
Joe Lubenow, "Postal Alert! Have You Survived Your Move Update Requirement?", Target Marketing, Aug. 1997, pp. 50-52.*

* cited by examiner

*Primary Examiner*—Shannon S Saliard
(74) *Attorney, Agent, or Firm*—McDermott Will & Emery LLP

(57) ABSTRACT

The present application generally relates to a method and system for identifying whether or not a particular mail piece has machine readable address correction service information and for providing feedback to a mailer or the Postal Service regarding errors in such requests and corrective action needed. In particular, the method relates to analyzing an encoded barcode containing address correction information to verify whether address correction service is requested. For each mail piece containing an address correction service request, the method includes verifying that address correction service request associated with the decoded barcode is valid.

7 Claims, 11 Drawing Sheets

Fig. 4

ACS Accuracy

| | | |
|---|---|---|
| 1004 | | Pieces Analyzed |
| 1004/1004 | 100% | Address Service Requested |
| 0/1004 | 0% | Change Service Requested |

Participant Codes Included: BYCCBCC, BYACCAAA, BYCABBC, BYABBC

| | | |
|---|---|---|
| 990/1004 | 99% | Participant Code Read |
| 950/990 | 96% | Participant Code Correct |
| 920/990 | 93% | Keyline Option Read |
| 880/920 | 95% | Keyline Option Correct |
| 920/920 | 100% | SPF Option Used |
| 800/920 | 87% | SPF Data Correct |

Fig. 5

ACS Exception

Mailing Agent: ABC Company   Participant Code: #BYCCBCC

Permit No: PI1234   Keyline: #0000000014664874#

Mailing Date: 6/5/03

UMF File Date: 5/30/03   Total Run Error:

Participant: 40 Keyline: 30

Piece Errors:

P: Class Y should be X

K: Check Digit 4 should be 3

```
#BYCCBCC )(##########ECRLOT##C-065      P66
#0000000014664874# WAHSE 030516
DAN PARENTI
BELL & HOWELL DOCUMAIL SYSTEMS
3400 PRATT
LINCOLNWOOD IL  60712-3700
|..||...|..||..||..|||..|||..||....|..|.||
```

↙ 31

Below Tolerance Listing

Current View: National
Change View

Reports
Weekly Mailing Summary Rollup
Failed Job Summary
Job Rollup
Inoperable MERLINs
Mail Piece Diagnostic Report
Summary Verification List
Excluded Jobs

Graphs
Piece Count (PS8040X)
POSTNET Barcode
Presort Verification (PS2866X)
Short Paid (PS6116X)
Barcode Errors
Presort Verification Errors
Overwrites Date Range: 5/1/2003 to 5/27/2003
National

| Job ID | MERLIN | Date | Failure Category | Review Classification | Score | Withdrawn |
|---|---|---|---|---|---|---|
| 1 | MER-00-0001 | 02/28/2003 | POSTNET Barcode Readability | Appealed | 72 | Yes |
| 22 | MER-00-0022 | 03/7/2003 | Presort Verification | Accepted as Reported | 21 | No |
| 28 | MER-00-0028 | 03/12/2003 | POSTNET Barcode Readability | Accepted as Reported | 41 | No |
|  |  |  | Presort Verification | Accepted with Adjustment | 80 |  |
| 43 | MER-00-0043 | 03/19/2003 | Piece Count | Accepted as Reported | 28 | No |
| 45 | MER-00-0045 | 03/22/2003 | Short Paid | Accepted as Reported | 39 | No |
| 55 | MER-00-0055 | 03/23/2003 | POSTNET Barcode Readability | Accepted as Reported | 67 | No |
|  |  |  | Piece Count | Accepted as Reported | 70 |  |
| 65 | MER-00-0065 | 03/25/2003 | Short Paid | Accepted as Reported | 90 | Yes |
| 71 | MER-00-0071 | 03/26/2003 | POSTNET Barcode Readability | Accepted with Adjustment | 77 | No |
| 80 | MER-00-0080 | 03/28/2003 | Piece Count | Accepted as Reported | 35 | No |
|  |  |  | Short Paid | Accepted as Reported |  |  |
| 87 | MER-00-0087 | 03/30/2003 | POSTNET Barcode Readability | Appealed | 47 | No |
|  |  |  | Presort Verification | Accepted as Reported | 80 |  |
|  |  |  | Piece Count | Accepted as Reported | 90 |  |

- Participant Code Verification
  - OCR Readable
    - *?Point Size*
    - *?Font Style: Non-Narrow variant Helvetica or Arial San Serif*
  - Not preceded with pound sign
  - Not a 7 character alpha code
  - Not in the Universal Mailer File (UMF) - *?period range lookup to an out dated UMF*
  - Not printed in an acceptable place
    - In Address Block
    - Aligned left
    - One Space before other information on line
  - Valid Class Identified

Fig. 9B

- Keyline Verification
  - OCR Readable
    - *?Point Size*
    - *?Font Style: Non-Narrow variant Helvetica or Arial San Serif*
  - Not preceded and followed by a pound sign
  - Character length
    - Less than 4 characters (not including the pound signs)
    - Greater than 16 characters (not including the pound signs)

Fig. 9C

- Keyline Verification (continued)
  - Invalid content configuration
    - alpha, numeric, or alphanumeric
    - Invalid length
    - *? Any other*
  - Invalid check digit
  - Not printed in an acceptable place
    - In Address Block
    - Aligned left
    - One Space before other information on line
  - Invalid Shipper Paid Forward Data
    - Declared weight
    - Declared rate

ADDRESS CORRECTION VERIFICATION AND FEEDBACK

CROSS REFERENCE TO RELATED APPLICATIONS

The present application claims the benefit of U.S. Provisional Application Ser. No. 60/479,045, filed Jun. 16, 2003, the disclosure of which is entirely incorporated herein by reference.

TECHNICAL FIELD

The present subject matter relates generally to computerized systems or networks for analyzing printed material on mail pieces. More particularly, the disclosed subject matter relates to computerized systems for reading, analyzing and verifying address correction request information printed on mail pieces.

BACKGROUND

Currently, the procedure for forwarding mail when a person has moved is time consuming, costly and entails a great deal of human effort. The process generally starts by a person submitting a handwritten card to the Postal Service indicating they have moved and providing a new address to which they would like their mail forwarded. This information is entered into a database and a mail carrier for the route is also notified. The mail carrier then is responsible for recognizing that a mail piece, which has already been sorted by the Postal Service, is addressed to a person that has moved. Upon recognizing that a mail piece is addressed to a person that has moved, the mail carrier does not deliver the mail piece but instead brings it back to the local Postal Service for processing. A computer operator, then inputs information from the mail piece, e.g., name, address, etc., into the database which stores information about people that have moved. If the input information matches information in the database, a sticker with new address information is printed and placed on the mail piece. The mail piece is then sent back to a new processing and data center (P&DC) and re-sorted to the appropriate local Postal Service.

In addition, the Postal Service only forwards first class mail without additional charge to the mailer. Mailers that send standard class mail must pay an additional fee to the Postal Service if they would like standard class mail pieces forwarded to the addressee. Mailers must also specifically request that a standard class mail piece be forwarded by placing a request in a predetermined location on the mail piece. Thus, mailers want to verify that the request for forwarding is properly provided on mail pieces prior to delivering them to the Postal Service to ensure that mail pieces will be forwarded if needed. Further, mailers that send large quantities of standard class mail would like their mailing lists to be as accurate as possible to reduce the amount of mail that needs to be forwarded. Mailers would also like to obtain information about an addressee that has moved as soon as possible so they can update their mailing lists and reduce fees incurred from having mail pieces forwarded.

In addition, the Postal Service offers Address Correction Service for all classes of mail provided the mail piece has the correctly applied components to enable the proper operation of the service. It is therefore desirable to automatically identify incorrectly applied components through analysis of an image of the mail piece. All required components are analyzed for deficiencies in application, such as location on the mail piece, format, font, content or other component deemed necessary by the Postal Service. Automated feedback will be provided to the interested party through networked connections identifying extent of non conforming mail, errors in the required components and corrective action needed.

SUMMARY

The present concepts provide a method and system for identifying whether or not a particular mail piece has properly requested address correction service, providing feedback to a mailer or the Postal Service regarding errors in such requests and electronically providing address correction data to mailers.

It is an object of the present subject matter to improve a mailer's mailing list with the latest and most accurate address correction information.

It is another object of the present subject matter to improve a mailer's mail preparation process by verifying and communicating component deficiencies such as location on the mail piece, format, font, content or other component deemed necessary by the Postal Service.

It is still further an object of the present subject matter to reduce mailer service fees and to reduce Postal Service handling costs associated with forwarding mail.

It is yet another object of the present subject matter to improve delivery performance of forwarded mail.

It is an additional object of the present subject matter to automate process associated with verification of address correction request information and to provide computerized data reports.

It is still an additional object of the present subject matter to improve address correction return rates.

The present subject matter provides a system for analyzing encoded address correction and participant information. The system includes an imaging device for creating an image of the encoded address correction and participant information on a mail piece. The system also includes a database which contains predetermined address correction and participant information. The system also has a computer which can convert the image of the encoded address correction and participant information into converted or decoded information, compare the converted or decoded information with the predetermined address correction and participant information, and generate verification result information indicating whether an error exists in the address correction information. The result information can be provided to a user at a terminal in the form of a report.

The following drawings and description set forth additional advantages and benefits of one or more examples. More advantages and benefits will be obvious from the description and may be learned by practice of the examples.

BRIEF DESCRIPTION OF THE DRAWINGS

The present subject matter may be better understood when read in connection with the accompanying drawings, of which:

FIG. 4 shows an example of a report showing the accuracy of ACS endorsements applied to a specific mailing that can be generated by the systems of FIGS. 1 and 3.

FIG. 5 shows another example of an ACS Exception report with an image of a failing mail piece that can be generated by the systems of FIGS. 1 and 3.

FIG. 8 shows another example of the Below Tolerance Listing, providing details on the job results, report that can be generated by the systems of FIGS. 1 and 3.

FIGS. 9A, 9B and 9C illustrate various address correction verification strategies using a mail verification device.

DETAILED DESCRIPTION

Figure 1:
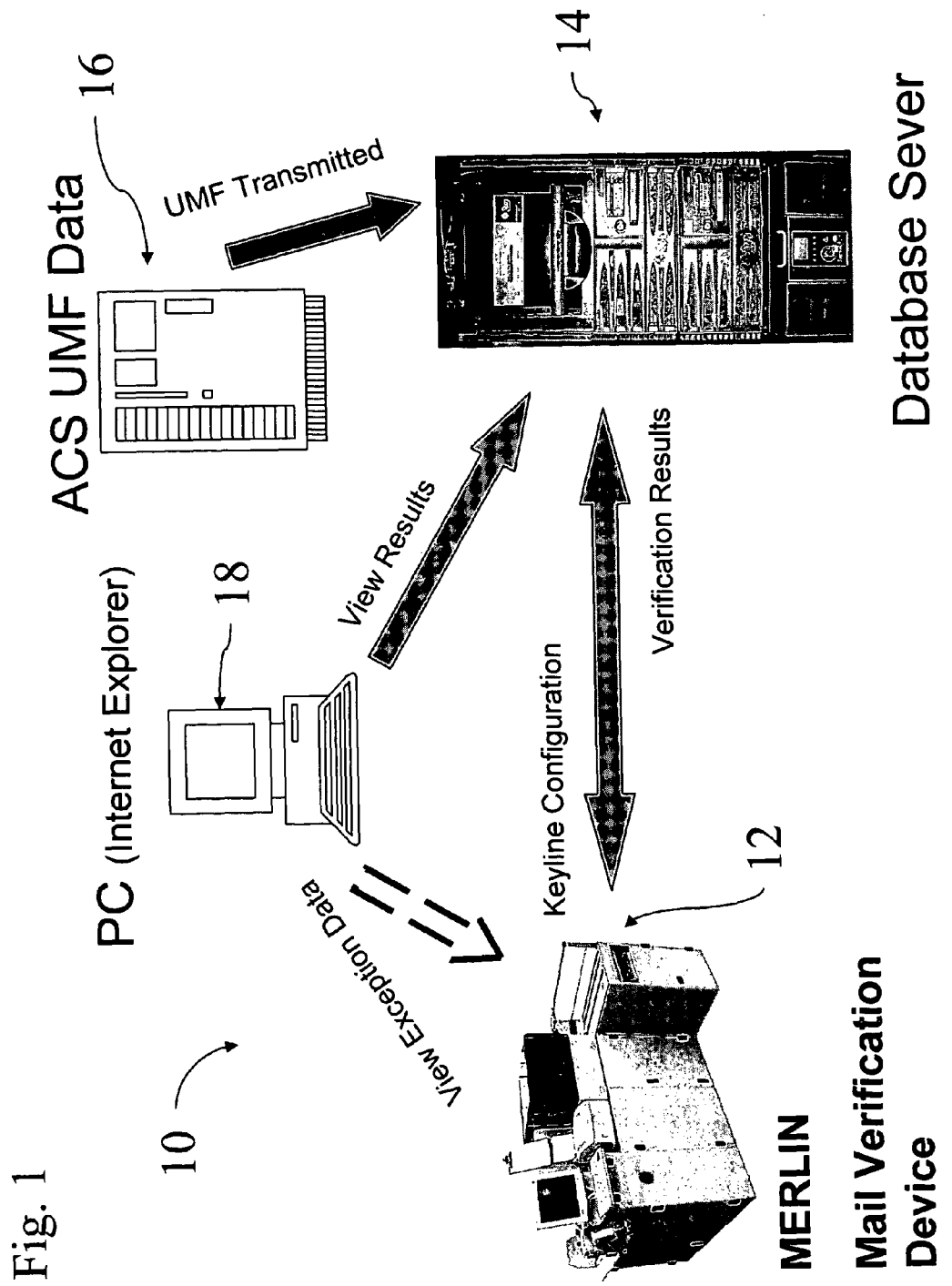
FIG. 1 shows a schematic diagram of one example of a system for processing address correction information on mail pieces.

FIG. 1 shows, schematically, an example of a system 10 that can be used to evaluate and process address correction information. As shown, the system 10 includes a mail verification device 12, such as an apparatus known a Mailing Evaluation, Readability, and Lookup Instrument (MERLIN). The mail verification device 12 is generally a computerized tool or apparatus that is used in a mail processing facility, such a postal facility of the United States Postal Service (USPS), to verify that a mailer has sorted or presorted mail pieces in the manner that the mailer is claiming to have done so prior to delivering the sorted mail pieces to the USPS for delivery by the USPS to the intended addressees. The USPS uses mail verification devices, such as the mail verification device 12, to verify the sorting done by the mailer and to thereby make a determination of what discounted rate may be given to a mailer that sorts or pre-sorts its mail pieces in a particular manner, e.g., by Zip Code, by city, region, etc., thereby reducing the workload on the USPS. The mail verification device 12 can also be configured to image, read and verify address request information on mail pieces.

Figure 2:
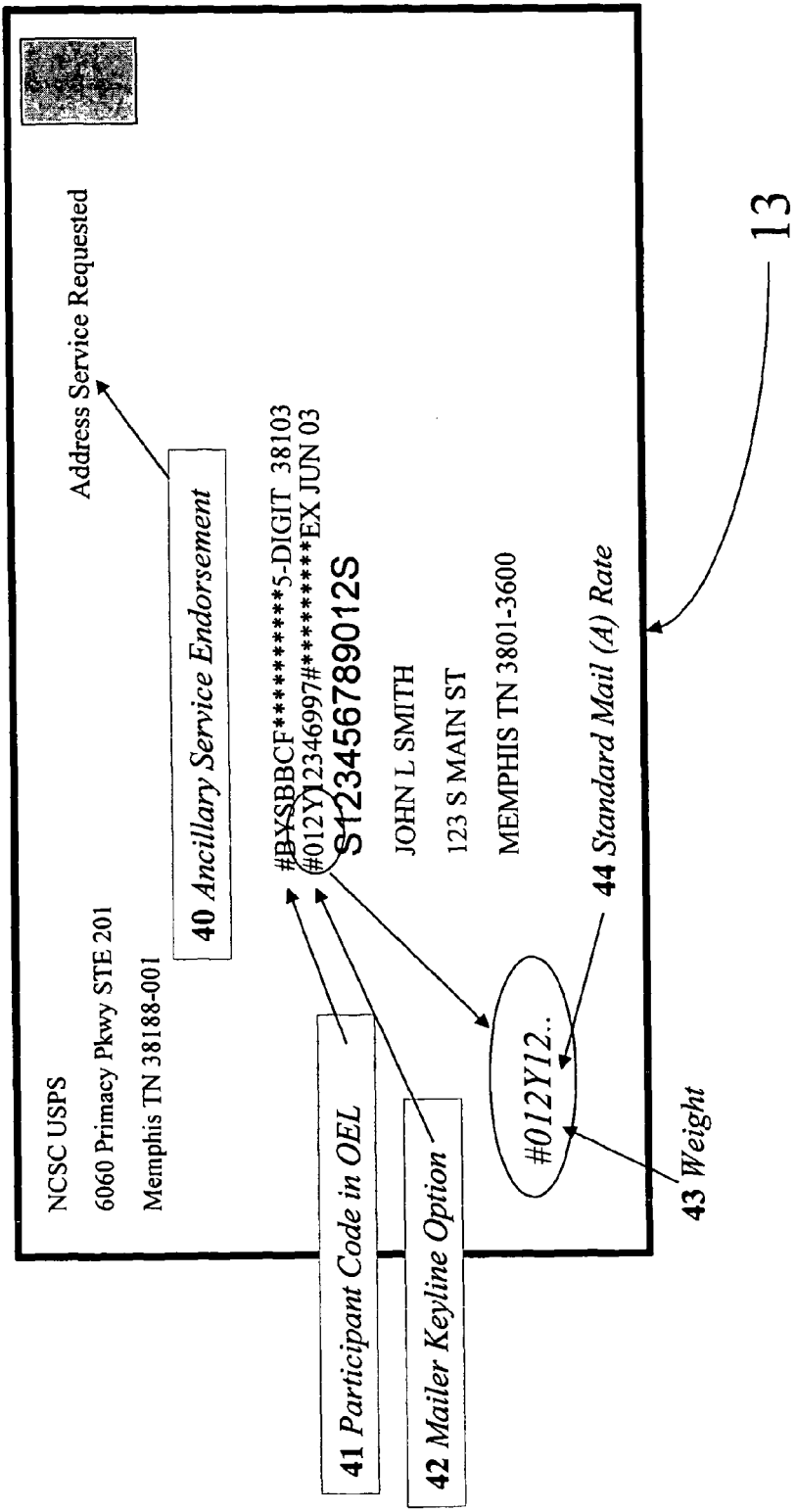
FIG. 2 shows an example of a mail piece with address correction endorsements printed thereon.

The mail verification device 12 can be used to verify address correction information on mail pieces such as the mail piece 13 shown in FIG. 2. For example, the mail verification device 12 can verify that ancillary "address service" requests or "change service" requests are properly printed in a particular location on the mail piece 13. Currently USPS regulations require that these types of requests be printed in one of four specific locations on the mail piece 13. The mail verification device 12 can also verify format, location and readability of other specific information printed on the mail piece related to address correction. Such information can be printed in ancillary address service endorsements 40. This specific information can also include a mailer's participant code 41, a mailer's key line option 42, the weight of the mail piece 43, the class of mail 44 and shipper paid forwarding option. The mail verification device 12 can store the data and/or verification results it generates from analyzing the mail piece 13 or mailing (a number of mail pieces) in a memory storage device within the mail verification device 12 for a predetermined time period, for example 30 days. Such data can include exception data. Exception data is information relating to a particular mail piece, e.g., an image of the mail piece and/or a report indicating defects in the printed address correction request information of a particular mail piece. The data can also include summary data which is data that provides results of analysis and statistics about a mailing, rather than an individual mail piece.

As shown in FIG. 1, the system 10 also includes a database server 14, an address correction server 16, and an interne computer 18. The mail verification device 12 can communicate with the database server 14. Information that the mail verification device 12 can send to the database server 14 includes the summary data. The database server 14 can then store the summary data for a predetermined time period, e.g., 13 months. The database server 14 can receive and store such summary data from more that one mail verification device 12. Accordingly reports (see FIGS. 4, 5, 6 and 7) can be generated by the database server 14 based on results from one or more mail verification device 12.

Universal Mailer File data ("UMF data") or other list structure that identifies participants and component content can be downloaded from the postal service system containing the data to the database server 14 or directly to the mail verification device 12. UMF data includes a predetermined set of participant code data in a format, both of which (the data and format) have been agreed upon between a particular mailer and the USPS.

The database server 14 can also communicate with the mail verification device and can send information such as UMF data, or portions thereof, e.g., participant code or keyline configuration information to the mail verification device 12. By sending keyline information to the mail verification device 12 from the database server 14, customer or mailer specific information that is used as the parameters for content and configuration can be downloaded into the mail verification device 12. In operation, when a mail verification device 12 is processing mail pieces and detects a new participant code on a mail piece 13, it can communicate with the database server 14 to get back participant code information for the new participant.

FIG. 2 shows a mail piece, with various address correction information printed thereon. As shown, the mail piece 13 address correction information includes: an ancillary service endorsement 40, an optional endorsement line 41 containing participant code information and 5-digit zip code information, and a mailer keyline 42, containing information about the weight 43 of the mail piece and the postage rate 44 at which the mail piece has been sent. Other address correction information may also be used.

Figure 3:
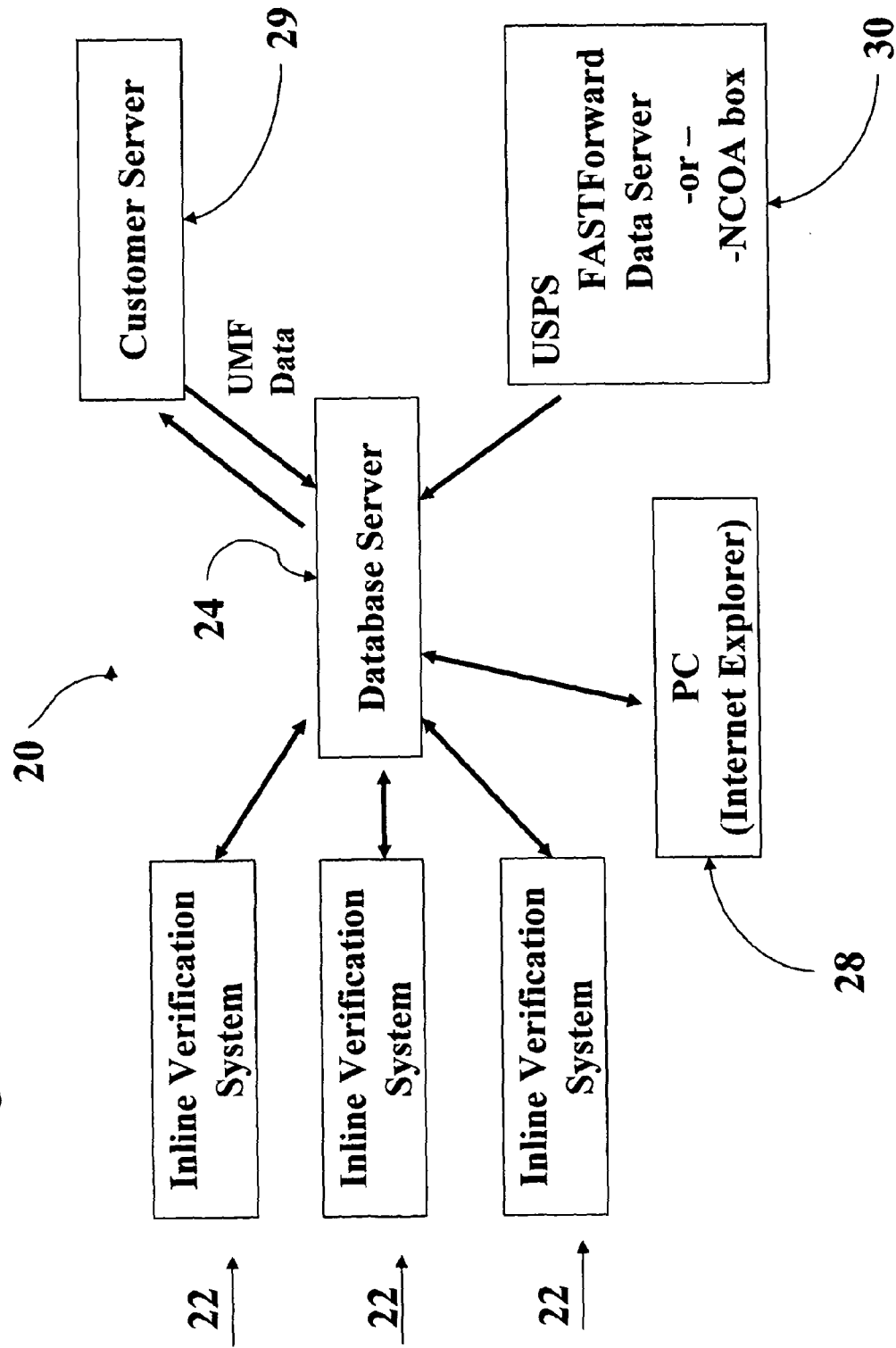
FIG. 3 shows an example of another system for processing address correction information on mail pieces.
Figure 6:
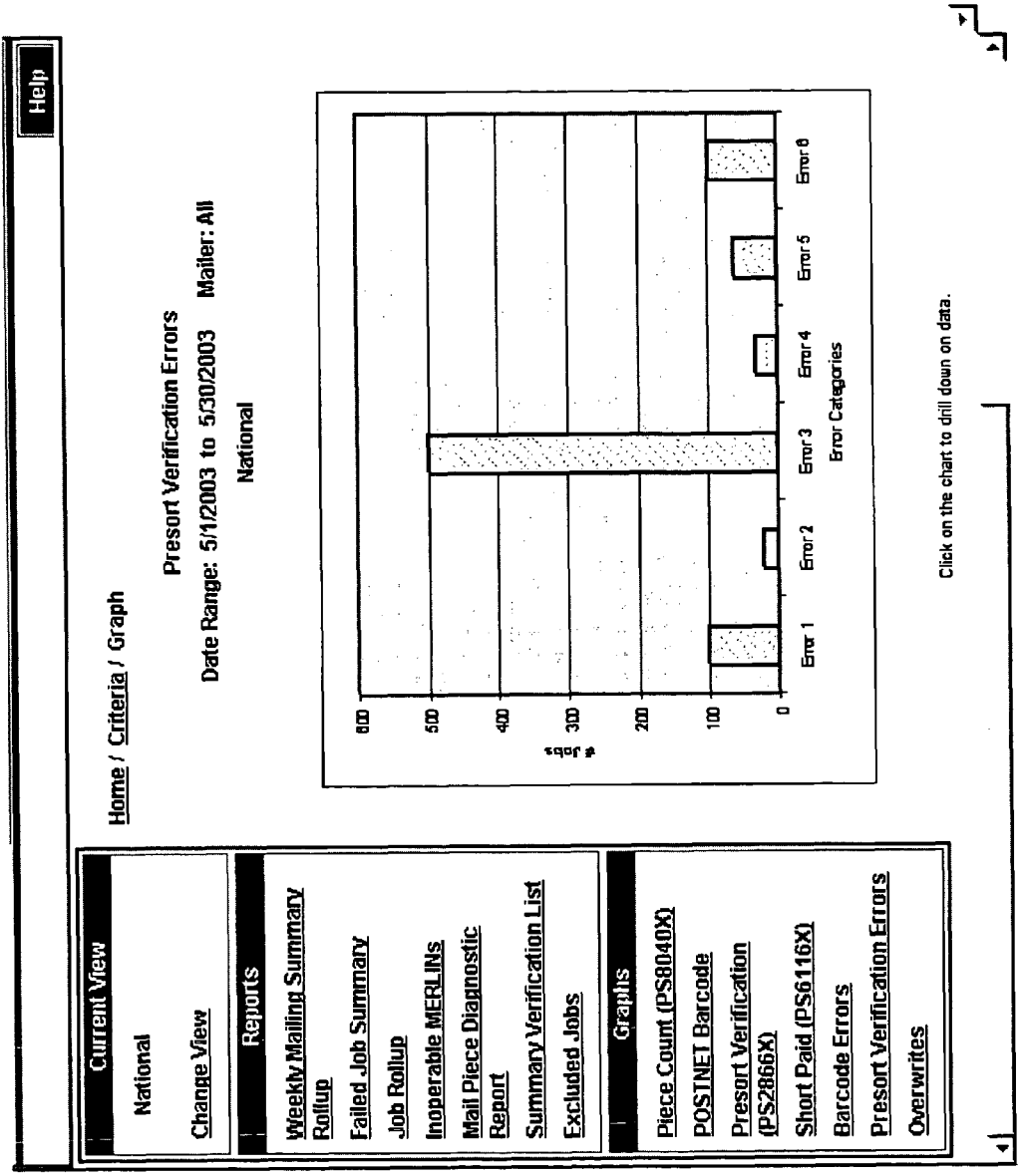
FIG. 6 shows another example of the Summarized Errors report that can be generated by the systems of FIGS. 1 and 3.
Figure 7:
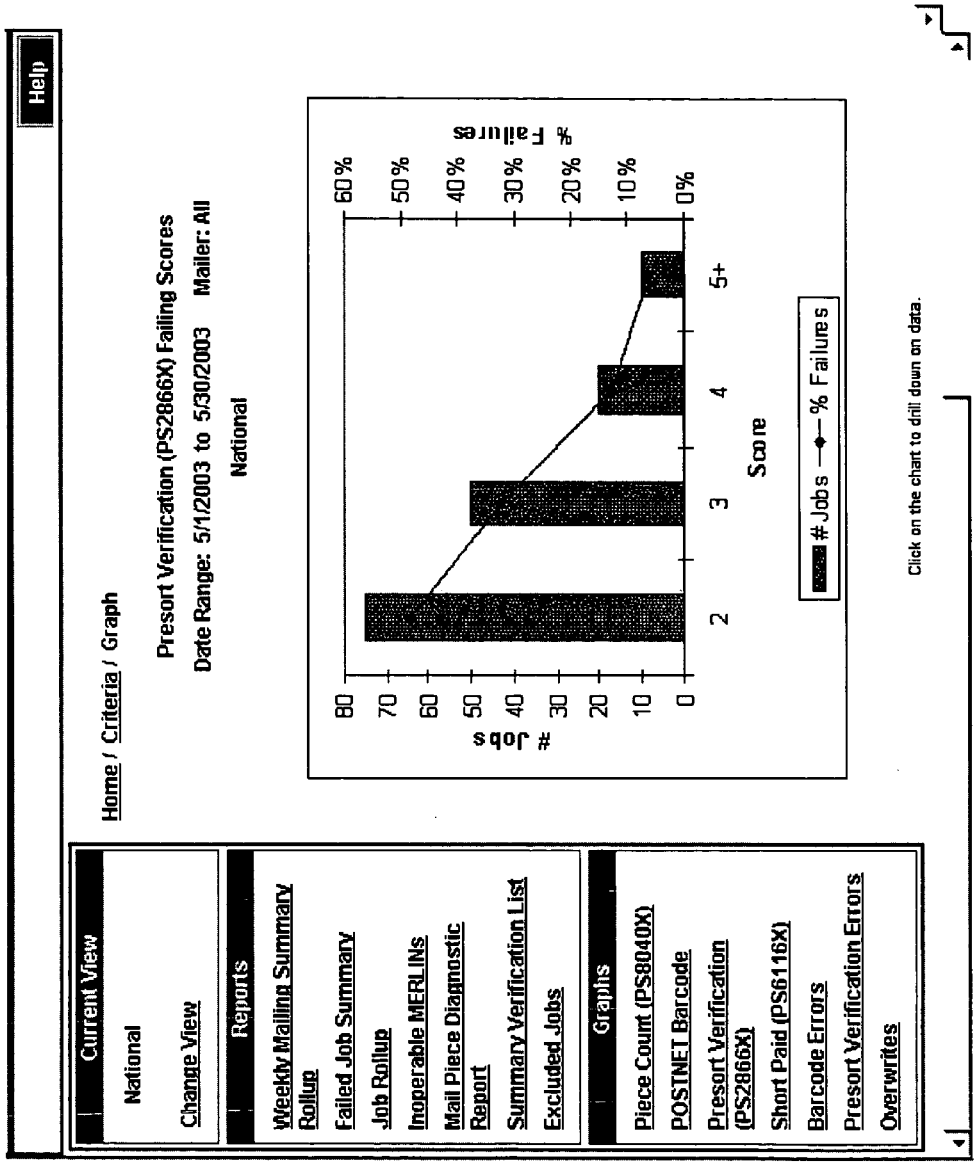
FIG. 7 shows another example of the Summarized Scores report to monitor the mailer performance over time that can be generated by the systems of FIGS. 1 and 3.

FIG. 3 shows, schematically, another example of a system 20 that can be used to evaluate and process address correction information. As shown, the system 20 includes a number of in-line verification systems (IVS) 22. An IVS 22 is generally a computerized tool or apparatus that is used in a mail processing facility, such a mailer's processing facility, to verify that a information printed on a mail piece 13 is properly readable by another system, such as a mail verification device 12. An IVS 22 can also be configured to image, read and verify address request information on mail pieces.

As described above with respect to the mail verification device 12, the IVS 22 can similarly be used to verify address correction information on mail pieces such as the mail piece 13 shown in FIG. 2. Also similarly, the IVS 22 can store the data and/or verification results it generates from analyzing the mail piece 13 or mailing (a number of mail pieces) in a memory storage device within the IVS 22 for a predetermined time period, for example 30 days. Such data can include exception data or summary data.

As shown in FIG. 3, the system 20 also includes a database server 24, a customer server 29, an interne computer 28 and a USPS "Fast Forward" data server or a USPS National Change of Address service (NCOA) box 30. The "Fast Forward" server or NCOA box contains a database with information regarding new address information for people that have requested their mail be forwarded. The IVS 22 can communicate with the database server 24. Information that the IVS 22 can send to the database server 24 includes the summary data. The database server 24 can then store the summary data for a predetermined time period, e.g., 13 months. The database server 24 can also receive and store such summary data from more that one IVS 22. Accordingly reports (see FIGS. 4 and 5) can be generated by the database server 24 based on results from one or more IVS 22.

In order for a customer to more easily use the system 20, information that identifies participants and address correction information, such as a Universal Mailer File data ("UMF data"), can also be downloaded from the customer server 29 to the database server 24.

The database server 24 can also communicate with the IVS 22 and can send information such as UMF data, or portions thereof, e.g., participant code or keyline configuration information to the IVS 22. By sending keyline information to the IVS 22 from the database server 24, customer or mailer specific information that is used as the parameters for content and configuration can be downloaded into the IVS 22. In operation, when an IVS 22 is processing mail pieces and detects a new participant code on a mail piece 13, it can communicate with the database server 24 to get back participant code information for the new participant.

The USPS Fast Forward server 30 can also communicate with the database server 24 to provide the customer (mailer) with updated addressee information for people that have moved and/or want their mail forwarded. This can help a mailer/customer update their mailing list electronically, and thus more quickly and accurately.

Generally, the steps associated with the system can include:

1) Imaging of a mail piece 13 on a mail verification device 12 or IVS 22. The image of the mail piece 13 can include address correction information. Address correction information may be an ancillary service endorsement, an optional endorsement line (with participant code information and/or 5-digit zip code information), key line information (containing information about the weight and/or postage rate) and address service requested information. The image may also include encoded address correction and/or participant information. For example, the encoded information may be in the form of a barcode, data matrix, or other encoded data formats.

2) Saving the images of the address correction information or any other subsets of the entire mail piece image in a memory storage device.

3) Using optical character recognition (OCR) to convert all or portions of the images to characters and save information about the characters. For example, this process can include segmenting the image into lines, segmenting the lines into words and then segmenting the words into characters and saving the characters. The UMF file can be used as a lexicon for the character generation to improve recognition. If the images are of barcodes or other encoded information, the imaged information is decoded rather than converted to characters using OCR.

4) Creating result information by comparing the saved values of the characters or the decoded information to the lexicon from the UMF to determine if the imaged information has any errors.

5) Providing result information on the analysis to a user. This can be done on the mail verification device 12, IVS 22 or via the database server 14 or 24 and may be in the form of a report showing any errors I the address correction and/or participant code information. The imaged address correction information and/or participant code information may also be provided to the user and/or provided in the report.

6) Storing the result information in a database.

Examples of various reports that can be generated' by the system 10 or 20 are shown in FIGS. 4-8. Reports such as these shown, and others, can be generated by, viewed on and printed by the mail verification device 12 or IVS 22. Alternatively such reports can be generated by, viewed on and printed by the database servers 14 or 24. The reports can also be created as web pages and accessed remotely by a user on a PC 18 or 28 at the database server 14 or 24 and on the mail verification device 12 or IVS 22 via the database server 14 or 24. The reports can also be sent with various levels of review and using encryption software to ensure security of the report content. Also as shown in FIG. 5, the report can include an image of a portion of the mail piece 31 including addressee information, participant code information and keyline information.

As shown in FIGS. 9A-9C, various verification strategies are shown. These strategies are various verifications or checks of the information on the mail piece that can be performed by the mail verification device 12 or by an IVS 22. Generally verifications may include a verification the address correction service is requested, a verification of the participant code to determine that it properly identifies a participant and a verification of the keyline to verify it is in a mailer specific format that has been pre-approved and agreed to by the USPS.

As shown in FIG. 9A, the checks that can be performed on the participant code 41 of a scanned address image include determining whether the characters are OCR readable and whether the characters are of the appropriate point size and font. Other checks include whether the participant code 41 is preceded by a pound sign ("#"), whether the code is a 7-digit alpha numeric code, whether the participant code 41 is one that is listed in the UMF and whether it is current, whether the participant code 41 is printed in an acceptable location (e.g., in the address block, aligned left and one space before other information on the line), and whether a valid class of mail is identified in the participant code.

As shown in 9B and 9C, checks that can be performed on the keyline 42 of a scanned address image include determining whether the characters are OCR readable and whether the characters are of the appropriate point size and font. Other checks include whether the keyline 42 is preceded by a pound sign ("#"), whether the code is at least 4, but not more than 16 characters, whether the keyline 42 content is configured properly, whether the keyline 42 has an appropriate check digit, whether the keyline 42 is printed in an appropriate place and whether the keyline has valid shipper paid forward data.

The reports shown in FIGS. 4-8, and various other reports, can be created based on the results of the check strategies performed by the mail verification device 12 and IVS 22, shown in FIGS. 9A-9C. Other check strategies may also be employed as required by the USPS or a mailer.

Many of the functions relating to the system 10 are implemented on a computer or computers, which of course may be connected for data communication via components of a network. The hardware of such computer platforms typically is general purpose in nature, albeit with an appropriate network connection for communication via the intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network.

The software functionalities (e.g., many of the operations described above) involve programming of controllers, including executable code as well as associated stored data. The software code is executable by the general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable medium. Execution of such code by a processor of the computer platform enables the platform to implement the system 10 or 20 functions, in essentially the manner performed in the embodiments discussed and illustrated herein.

As used herein, terms such as computer or machine readable storage medium refer to any storage medium that participates in providing instructions to a processor for execution. Such a medium may take many forms, including but not limited to, non-volatile storage media, and volatile storage media. Non-volatile storage media include, for example, optical or magnetic disks, such as any of the storage devices in any computer(s). Volatile storage media include dynamic memory, such as main memory of such a computer platform. Common forms of computer-readable storage media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other storage medium from which a computer can read programming code and/or data. Many of these forms of computer readable storage media may be involved in carrying one or more sequences of one or more instructions to a processor for execution.

While the foregoing has described what are considered to be the best mode and/or other examples, it is understood that various modifications may be made therein and that the technology disclosed herein may be implemented in various forms and examples, and that they may be applied in numerous applications, only some of which have been described herein. It is intended by the following claims to claim any and all modifications and variations that fall within the true scope of the advantageous concepts disclosed herein.

The invention claimed is:

1. A method for analyzing an encoded barcode printed on a mail piece by using a verification system including a computer, the encoded barcode containing address correction information to verify whether address correction service is properly requested, the method comprising steps of:
   creating an image of the encoded barcode printed on the mail piece with an imaging device;
   decoding, by using the verification system, the image of the barcode;
   determining, by using the verification system, whether address correction service is requested based on the decoded image of the barcode, wherein the address correction service request includes an ancillary service endorsement and participant code;
   for each mail piece containing an address correction service request, verifying, by using the verification system, based on the decoded image of the barcode, that the ancillary service endorsement and the participant code are contained in the barcode as required by a standard; and
   for each mail piece on which the ancillary service endorsement and the participant code are contained in the barcode as required by a standard, verifying, by using the verification system, address correction service request associated with the decoded barcode is valid.

2. The method of claim 1, further comprising the step of generating a report containing an image of the mail piece and information about any errors relating to indication of the ancillary service endorsement and the participant code contained in the barcode, the report including the error for each of the ancillary service endorsement and the participant code.

3. The method of claim 1, wherein the step of verifying that address correction service request associated with the decoded barcode is valid includes verifying that the participant code is registered with a post service.

4. A computer comprising:
   one or more processors; and
   a physical machine-readable storage medium and executable code embodied in the medium, wherein execution of the code by one or more processors causes the one or more processors to perform the method of claim 1.

5. A program product, comprising a physical machine-readable storage medium and executable code embodied in the medium, wherein execution of the code by at least one programmable computer causes the at least one programmable computer to perform the steps of the method of claim 1.

6. The method of claim 1, further comprising the step of storing a validated verification result information in a database.

7. The method of claim 2, wherein the report contains an image of a return address.

* * * * *